United States Patent
Bermejo et al.

(10) Patent No.: US 11,745,460 B2
(45) Date of Patent: Sep. 5, 2023

(54) 3D EMBOSSED FILM

(71) Applicant: Bixby International Corporation, Newburyport, MA (US)

(72) Inventors: Ethel Bermejo, Somerville, MA (US); Marc Gagnon, Exeter, NH (US); Jeff Raymond, Newburyport, MA (US); Dennis Lauzon, Newton, NJ (US)

(73) Assignee: Bixby International Corporation, Newburyport, MA (US)

(*) Notice: Subject to any disclaimer, the term of this patent is extended or adjusted under 35 U.S.C. 154(b) by 0 days.

(21) Appl. No.: 17/343,031

(22) Filed: Jun. 9, 2021

(65) Prior Publication Data

US 2021/0379860 A1    Dec. 9, 2021

Related U.S. Application Data

(60) Provisional application No. 63/036,852, filed on Jun. 9, 2020, provisional application No. 63/108,552, filed on Nov. 2, 2020.

(51) Int. Cl.
| | |
|---|---|
| *B32B 3/30* | (2006.01) |
| *B32B 5/02* | (2006.01) |
| *B32B 7/12* | (2006.01) |
| *B32B 27/12* | (2006.01) |
| *C09J 7/21* | (2018.01) |
| *C09J 7/26* | (2018.01) |
| *C09J 9/00* | (2006.01) |

(52) U.S. Cl.
CPC .......... *B32B 3/30* (2013.01); *B32B 5/024* (2013.01); *B32B 7/12* (2013.01); *B32B 27/12* (2013.01); *B32B 2437/00* (2013.01)

(58) Field of Classification Search
CPC .. B32B 3/30; B32B 5/024; B32B 7/12; B32B 27/12; C09J 9/00; C09J 2203/358; C09J 2301/10; C09J 7/10; C09J 7/21; C09J 7/26

See application file for complete search history.

(56) References Cited

U.S. PATENT DOCUMENTS

| | | | |
|---|---|---|---|
| 4,655,768 A * | 4/1987 | Marecki | A61F 13/0223 424/448 |
| 5,411,783 A | 5/1995 | Mahn | |
| 5,736,470 A * | 4/1998 | Schneberger | C09J 7/21 428/317.1 |
| 6,121,166 A | 9/2000 | Wood et al. | |
| 6,838,150 B2 | 1/2005 | Mazurek et al. | |
| 7,087,539 B2 | 8/2006 | Carbonare | |

(Continued)

OTHER PUBLICATIONS

"International Search Report and Written Opinion received for PCT Patent Application No. PCT/US2021/036573", dated Oct. 4, 2021, 9 pages.

*Primary Examiner* — Joanna Pleszczynska
(74) *Attorney, Agent, or Firm* — Adler Pollock & Sheehan P.C.

(57) ABSTRACT

The present invention relates to a multi-layered composite garment material comprising at least a fabric layer and a functionalized adhesive sheet layer. The present invention also relates to a functionalized adhesive sheet or film comprising 3D adhesive structures embossed on the sheet or film. The sheet or film can be used to bind multiple garment layers while maintaining or enhancing the characteristics of the individual garment layers.

18 Claims, 7 Drawing Sheets

(56) References Cited

U.S. PATENT DOCUMENTS

| | | | |
|---|---|---|---|
| 8,323,773 B2* | 12/2012 | Flanigan | C09J 7/38 428/156 |
| 9,394,466 B2 | 7/2016 | Sherman et al. | |
| 2001/0051264 A1* | 12/2001 | Mazurek | B29C 43/28 428/156 |

* cited by examiner

3D EMBOSSED FILM

PRIORITY CLAIM

This application claims priority from U.S. Provisional Patent Application No. 63/036,852 filed Jun. 9, 2020, and U.S. Provisional Patent Application No. 63/108,552 filed Nov. 2, 2020, the contents of which are incorporated herein in their entirety.

BACKGROUND OF THE INVENTION

Field of Invention

The present invention relates to a multi-layered composite garment material comprising at least a fabric layer and a functionalized adhesive sheet layer. The present invention also relates to a functionalized adhesive sheet or film comprising 3D adhesive structures embossed on the sheet or film. The sheet or film can be used to bind multiple garment layers while maintaining the characteristics of the individual garment layers.

Description of Related Art

Precursors of today's sportswear emerged in New York before the Second World War. Clare Potter and Claire McCardell were among the first American designers in the 1930s to gain name recognition through their innovative clothing designs, which were described as demonstrating "problem-solving ingenuity and realistic lifestyle applications." Garments were designed to be easy-to-wear and comfortable using practical fabrics such as denim, cotton, and jersey. McCardell in particular was considered as America's greatest sportswear designer. Her simple, practical clothes suited the relaxed American dress code, neither formal nor informal, that became established during the 1930s and 1940s. McCardell once proclaimed: "I belong to a mass production country where any of us, all of us, deserve the right to good fashion". Martin credits the 1930s and 40s sportswear designers with freeing American fashion from the need to copy Paris couture.

One of the hallmarks of sport or athletic wear was the flexibility it afforded the user. In particular, individuals could use different forms of clothing while undertaking casual or rigorous activity. The clothing could be long-sleeved and flexible as needed for sporting activities. The athletic wear needed to be made from flexible fabric.

Disclosed in U.S. Pat. No. 8,652,286 is a stretchable appliqué including a stretchable substrate having a first surface and a second surface opposite the first surface, an adhesive layer adjacent to the first surface of the stretchable substrate, a carrier layer adjacent to the adhesive layer wherein the adhesive layer is between the stretchable substrate and the non-stretchable carrier layer and the carrier layer is less stretchable than the stretchable substrate and at least one indicium on the second surface of the stretchable substrate. The adhesive layer and the substrates that it glues together retain their own stretching properties and thus the adhesive layer does not incorporate itself with the different layers of the fabric.

Existing fabrics used in athletic wear or clothing used by the general public have the stretchability but the structural integrity of these fabrics tend to be compromised because the adhesive tapes currently used to bind the fabrics lose their structural integrity and functionality. This loss of structural integrity and functionality make the fabrics and the clothing less effective in terms of their elasticity. The clothing with stretchable fabrics, for example, include upper body and lower body garments that expand when worn by healthy individuals or when an individual's body expands due to other reasons. Given that the currently available elastic sheets/tape which are applied at the interface of two stretchy fabrics do not revert back to their original position after being stretched there is a need for adhesive sheets or films that will help maintain the structural integrity of the fabrics into which they are incorporated.

SUMMARY OF THE INVENTION

Keeping the continued need for better stretchable fabrics and adhesive sheets, the present invention provides a multi-layered composite garment material comprising at least a fabric layer and a functionalized adhesive sheet layer. The present invention also relates to a functionalized adhesive sheet or film comprising 3D adhesive structures embossed on the sheet or film. The sheet or film can be used to bind multiple fabric layers while maintaining or enhancing the characteristics of the individual fabric layers according to the designed garment functionality.

DETAILED DESCRIPTION

The current invention provides an embossed 3D adhesive structure that enables thin adhesive films to maintain its main functionality after being bonded to substrates. The embossed 3D adhesive structures are embossed on elastic adhesive films which helps maintain the structural integrity and functionality of a thin elastic tape/film applied at the interface of two stretchy fabrics in any garment.

The 3D structures embossed adhesive tape/film promotes optimal bonding between the fabric and the porous substrate that they are applied to by having about one third of the 3D adhesive structures penetrate through and deposit on each side of the substrate materials respectively. This leaves the last third of the embossed 3D structures between the fabric substrates and the film thereby maintaining the stretch function and recovery on the seamless garments.

The thin adhesive film of the instant invention has applications in fashion textiles, seamless garments and elastics in apparel and textiles by forming heat-sealed (not sewing), breathable, compressive garments, sportswear, embossed thermoplastic elastics and textiles. It would be used as heat-sealing tapes for functional textiles in intimate apparel garments, compression garments, swimwear, sportswear, footwear, outerwear, or particular functional textiles such as tents, chemical clothing, firefighter uniforms and military. Examples of intimate apparel include waistbands, leg bands, under bands of bras. The heat adhesive film product of the instant invention is better than latex, silicone and natural rubber elastic products that can't be formed or bonded in the downstream processes used in the clothing industry. In addition, the product of the instant invention avoids allergic reactions experienced with latex or silicon materials. Other advantages include replacing sewn seams in various types of clothing as well as footwear.

Other advantages of using the 3D structure embossed adhesive film are that:

1. it eliminates the need of using multi-laminate structure with a core layer functioning as the elastic tape and the exterior layers functioning as adhesive substrates;

2. it prevents/minimizes "bagging" effect on stretchy fabrics when used more than once and provides high durability;

3. the geometry of the 3D embossing helps alter the functionality of the fabric wherein the direction and degree of stretching force can be controlled.

4. it allows very thin embossed film be used to allow for design of low-elastic force for under garments or active wear fabric laminations.

The invention provides adhesive tape/film with several 3D or custom geometries embossed and/or perforated structures that can be applied as hot-melt tapes. The instant elastic adhesive film provides optimal bonding and functionality by having one third of the adhesive penetrate through and deposit onto each side of the substrate materials. The other third part of the adhesive remains between the two pieces of fabric to provide the stretch and recovery needed.

The instant invention helps eliminate the need and costs of recurring to a multi-laminate alternative for thin tapes. It also provides an increased strength on either the axial or cross direction by providing a stiffening effect thanks to the flexible design. The proposed designs prevent 'bagging' of the fabric allowing the garments with a tape to maintain their original shape for longer usage.

The instant invention in one of its broadest aspects provides an adhesive sheet comprising surface-embossed 3D adhesive structures. A preferred embodiment provides a sheet wherein the adhesive sheet comprises an adhesive layer and the sheet is functionalized and the 3D adhesive structures are capable of bonding to a substrate wherein the substrate is selected from a non-stretchable fabric or a stretchable fabric. Another preferred embodiment provides a sheet wherein both surfaces of the sheet are embossed with the 3D adhesive structures.

Another preferred embodiment provides a sheet wherein the adhesive 3D structures bond to a porous substrate and wherein further at least 20% of the 3D adhesive structures bond with the porous substrate. Yet another preferred embodiment provides a sheet wherein the bonding of the 3D adhesive structures occurs wherein from about 25% to about 33% of the adhesive structures penetrate through the porous substrate and about 33% to about 50% of the 3D adhesive structures are deposited between the sheet and the substrate.

Provided in yet another embodiment is a sheet wherein the sheet has a stretchable function, and the sheet is bonded to a porous substrate selected from a fabric, dry-fit fabric, elastomeric fabric, breathable fabric or a combination thereof. A further embodiment provides a sheet wherein each substrate has elasticity to stretch and recover/recoil from the stretch.

A further preferred embodiment provides a substrate wherein the substrate is selected from stretchable or breathable fabrics (e.g., dry-fit, Poly-Dri, Lycra, Spandex, cotton, wool, etc.). The fabrics selected from fibers based on polyester, thermoplastic polyester elastomers, thermoplastic polyurethane, polyamides, microfibers made from woven acrylic, polyester or rayon filaments, styrenic block copolymers, block copolymer of polyester-polyurethane and rayon, polypropylene flexible PVC, and natural fibers like cotton, wool, or bamboo.

Another preferred embodiment provides a functionalized adhesive sheet wherein the functionalized adhesive sheet consists of a 3D embossed surface of a film wherein the single layer composition is formed from one or more of a thermoplastic elastomer and a 3D-embossed adhesive layer on one or both sides of the film. A further preferred embodiment provides a functionalized adhesive sheet wherein the thermoplastic elastomer is selected from styrenic block copolymers, thermoplastic polyurethane, polyester-polyurethane or polyurea, polyamides, and polyester, or blends thereof.

Yet another preferred embodiment provides a functionalized adhesive sheet wherein the adhesive layer comprises a functionalized olefinic homo, copolymers, terpolymers and styrenic block copolymers, polyurethane, polyamide adhesives, or blends thereof. A further preferred embodiment provides a functionalized adhesive sheet wherein the functionalized homo or copolymers or terpolymers are selected from the maleic anhydride or glycidyl acrylate or amine grafted homo, copolymers of ethylene, propylene or butane. Yet another preferred embodiment the adhesive layer is selected from styrenic block copolymers, thermoplastic polyurethane, polyester-polyurethane or polyurea, polyamides and polyester.

Another aspect of the present invention provides a multi-layered composite garment material comprising at least a fabric layer and a functionalized adhesive sheet layer. A preferred embodiment of this aspect provides a multi-layered composite garment material wherein the fabric layer is stretchable and wherein the functionalized re-enforced adhesive sheet layer is stretchable.

Another preferred embodiment provides a multi-layered composite garment material wherein the fabric layer is made from natural material, synthetic material or a combination thereof and wherein the functionalized re-enforced adhesive sheet layer is surface embossed with 3D adhesive structures. A further preferred embodiment provides a multi-layered composite garment material wherein the 3D adhesive structures of the adhesive sheet layer bond with the fabric layer by penetrating into the fabric layer.

Another preferred embodiment provides a multilayered composite garment material wherein the bonding of the 3D adhesive structures with the fabric layer occurs wherein from about 25% to about 33% of the adhesive structures penetrate through the fabric layer and wherein about 33% to about 50% of the 3D adhesive structures are deposited between the adhesive sheet and the fabric layer.

Another preferred embodiment provides a multi-layered garment material wherein the garment material is stretchable and breathable. A further preferred embodiment provides a multi-layered garment material wherein the multi-layered composite garment comprises a dry-fit, elastomeric or breathable fabric layer, and an intermediate layer comprises one or more thermoplastic elastomer layers, a 3D-embossed adhesive layer and a fabric.

A further preferred embodiment provides a multi layered garment material wherein the dry-fit, elastomeric, and breathable fabric is selected from fibers based on polyester, thermoplastic polyester elastomers, thermoplastic polyurethane, polyamides, microfibers made from woven acrylic, polyester or rayon filaments, styrenic block copolymers, block copolymer of polyester-polyurethane and rayon, polypropylene, flexible PVC, and natural fibers like cotton, wool, or bamboo.

The instant invention with the adhesive films/sheets embossed with 3D adhesive structures provides adhesive films that are thinner than previously used adhesive films. The elastic films instantly provided have zero or close to zero elastic loss due to hysteresis. The instantly provided thin films embossed with raised 3D adhesive structures also provide sufficient adhesive material to bond fabrics together while maintaining a continuous elastic web (the base film thickness) between fabrics.

The instantly provided adhesive sheet/film/tape with 3D embossed geometrical structures do not require using multi-laminate structures with a core layer functioning as the elastic tape and the exterior layers functioning as adhesive substrates. Both thick and thin films can be made to control the amount of force, low to high, applied by the elastic sheet. It further minimizes a bagging effect on stretchy fabrics when stretched in use multiple times and provides high durability. The functionality (resilient force and direction) of the adhesive film can be controlled by the web thickness and the 3D emboss geometry design used, i.e., the force to stretch along the perpendicular axis can be altered through design elements along or across that axis The invention also provides use of a thin thermoplastic sheet, strip or tape having the raised 3D emboss that melt bonds into a stretchy fabric surface while the base web of the tape or sheet remains intact to apply small elastic recovery force provided by the thin web in very light or thin apparel applications.

Definitions

The terms included in the instant specification to describe the invention have the general meaning as understood by one skilled in the art in addition to the discussion below.

The term "sheet" as used herein is intended to represent a sheet or a film which generally has a hot-melt adhesive functionality and is useful to glue two distinct layers of substrates together. The sheet in the instant invention can be embossed with 3D structures that are capable of bonding to a substrate. The sheet is generally elastic in nature such that it is stretchable in different directions but is capable of recovering from the stretch.

The term "dry-fit fabric" is intended to represent a high-performance, microfiber, polyester fabric that moves sweat away from the body and to the fabric surface where it evaporates. This keeps athletes dry and comfortable. Dry-fit fabrics are used in a variety of products, including shirts, socks, pants, shorts, sweatshirts, sleeves, hats, gloves and more. Dry-fit body mapping fabric construction features strategically placed ventilation zones to allow air to flow and cool the body where most needed.

The term "breathable fabric" represents fabric material which allows air to flow through it thereby helping to cool the body.

FIGURES

Figures discussed below represent illustrative examples of the adhesive sheet with 3D structures provided by the instant invention. The instant figures illustrate some of the 3D structures that can be embossed on the adhesive sheets. It is understood that a variety of 3D structures and sizes as well as different combinations of 3D structures can be embossed on the adhesive sheets for the functioning of the instantly claimed invention. The instant figures are for illustrative purposes and not intended to limit the scope of the invention.

EXAMPLES

Adhesive sheets of the present invention comprise an adhesive layer and a surface is embossed with 3D structures. The 3D structures have adhesive properties. The following examples illustrate the adhesive sheet embossed with different 3D structures. It is understood that a variety of 3D structures and sizes as well as different combinations of 3D structures can be embossed on the adhesive sheets for the functioning of the instantly claimed invention. The instant examples are for illustrative purposes and not intended to limit the scope of the invention. It is also understood that the gauge of the film itself can be adjusted for applying varying elastic force.

Procedure

Figure 1:
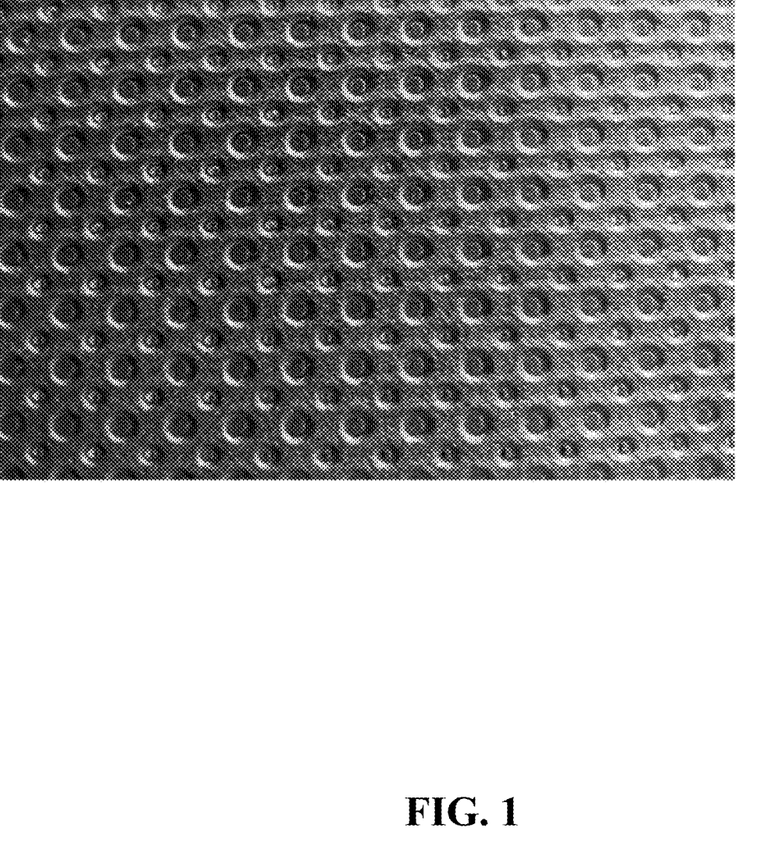
FIG. 1: Depicted in FIG. 1 is an adhesive sheet with embossed 3D structures wherein the structures are circular with a depression in the center. The 3D structures are arranged such that they are placed in close proximity to each other, approximately about 1 to about 4 mm from each other, and protrude above the surface of the adhesive sheet and have adhesive abilities thereby making them capable of adhering to other surfaces. The smaller circular depressions also include a perforation for breathability.
Figure 2:
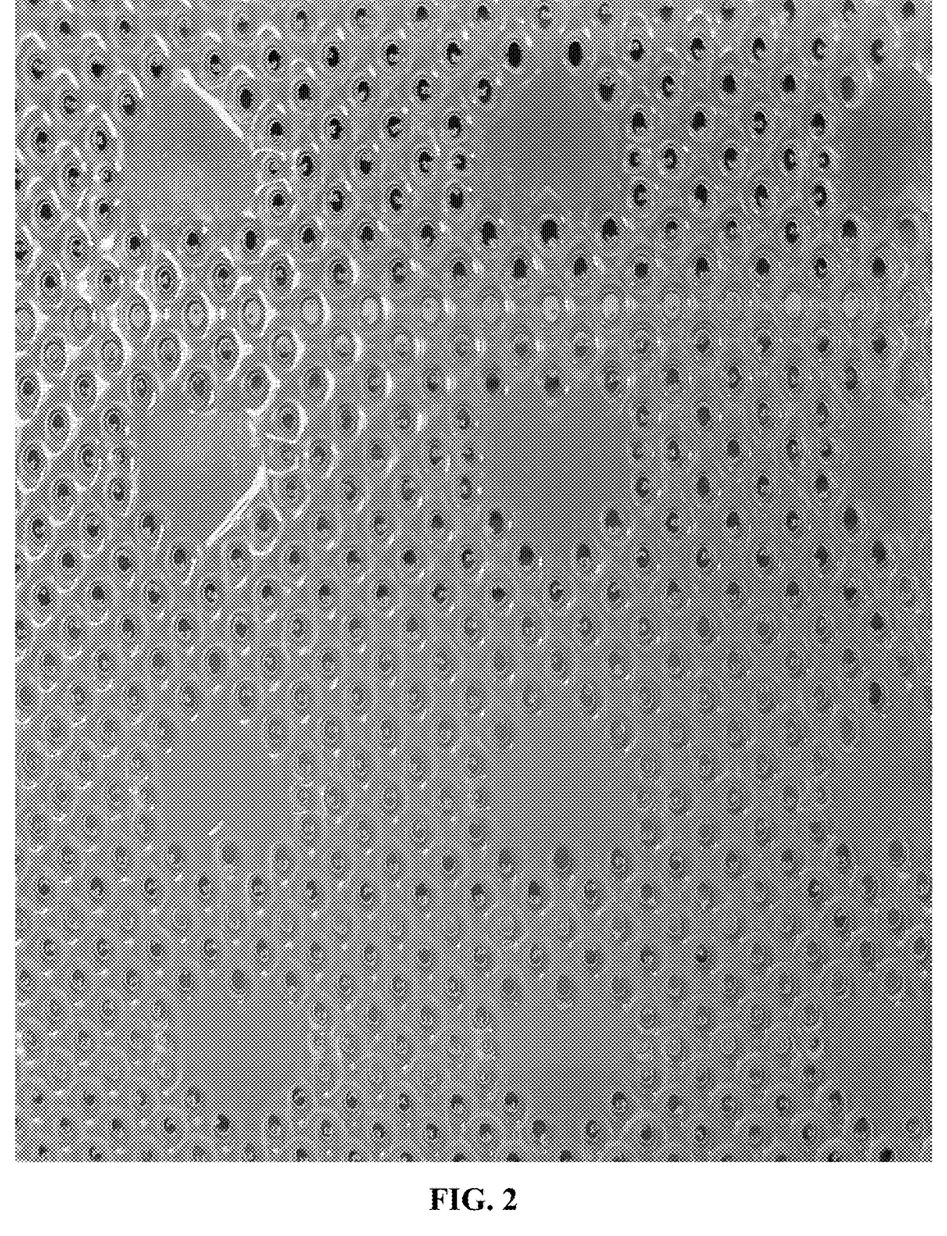
FIG. 2: Depicted in FIG. 2 is an adhesive sheet with embossed 3D structures wherein the structures are heart-shaped and are arranged on the adhesive sheet such that each 3D structure is about 1 to about 4 mm apart from each other. The 3D structures protrude above the surface of the adhesive sheet and have adhesive abilities thereby making them capable of adhering to other surfaces.
Figure 3:
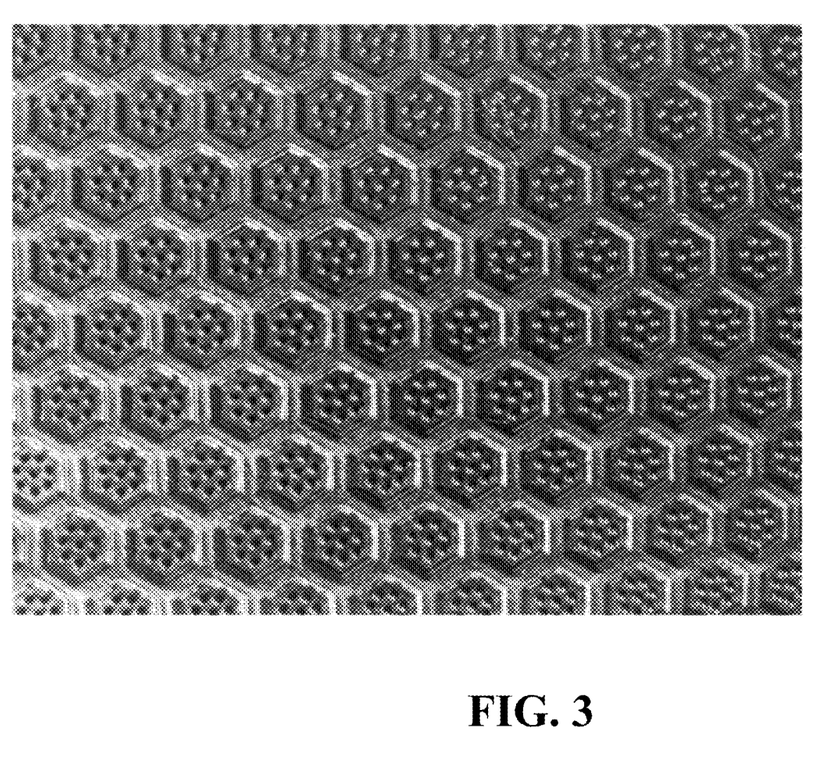
FIG. 3: Depicted in FIG. 3 is an adhesive sheet with embossed 3D structures wherein the structures are hexagonally shaped. The 3D structures are arranged such that they are placed in close proximity to each other, approximately about 0.9 mm from each other thereby forming a uniform pattern, and protruding above the surface of the adhesive sheet and have adhesive abilities thereby making them capable of adhering to other surfaces.
Figure 4:
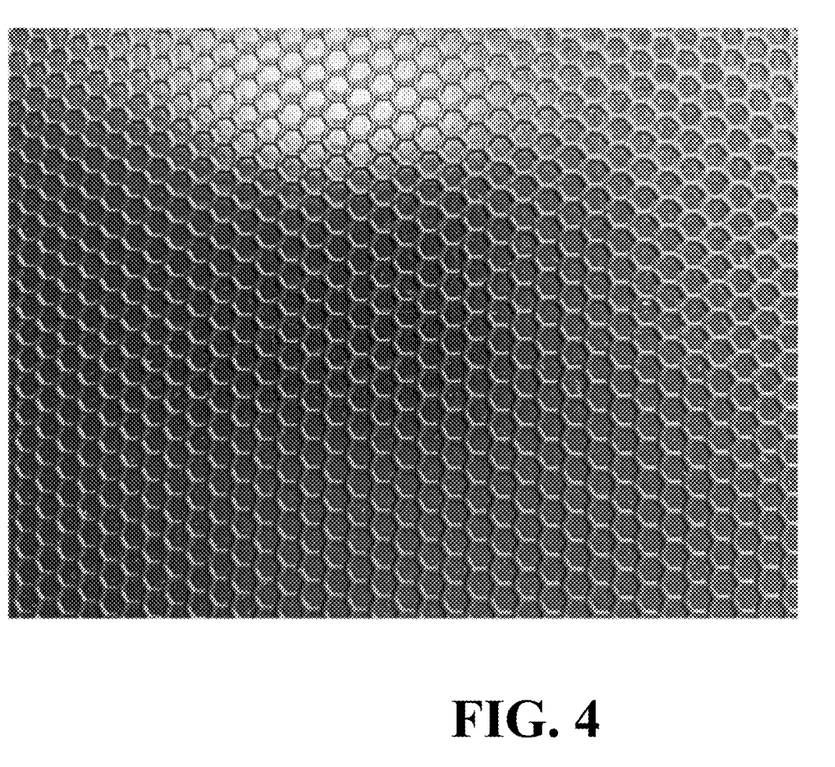
FIG. 4: Depicted in FIG. 4 is an adhesive sheet with embossed 3D structures wherein the structures are hexagonally shaped. The 3D structure arrangement in this figure differs from the arrangement in FIG. 3 in that the 3D structures are arranged such that they are placed in close proximity to each other wherein the hexagonal structures are connected to each other forming a honey comb design. These structures protrude above the surface of the adhesive sheet and have adhesive abilities thereby making them capable of adhering to other surfaces.
Figure 5:
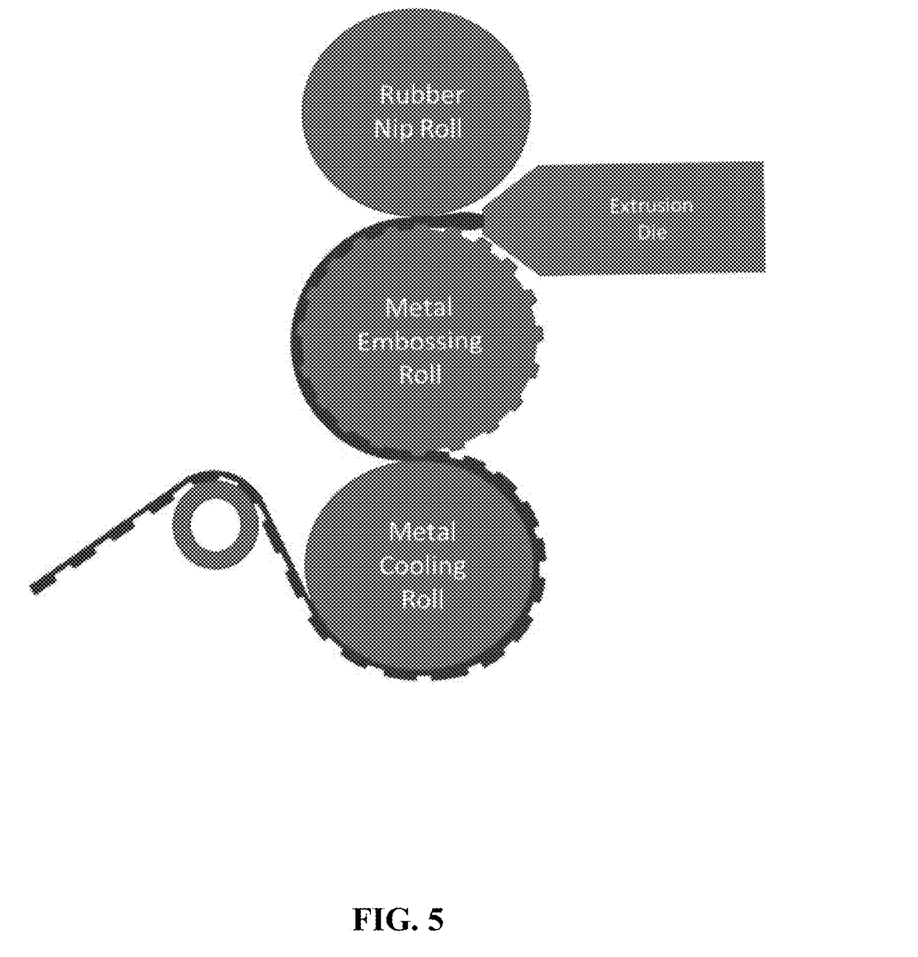
FIG. 5: Shown in FIG. 5 is an extrusion die assembly used to make the 3D embossed films of the instant invention.
Figure 6:
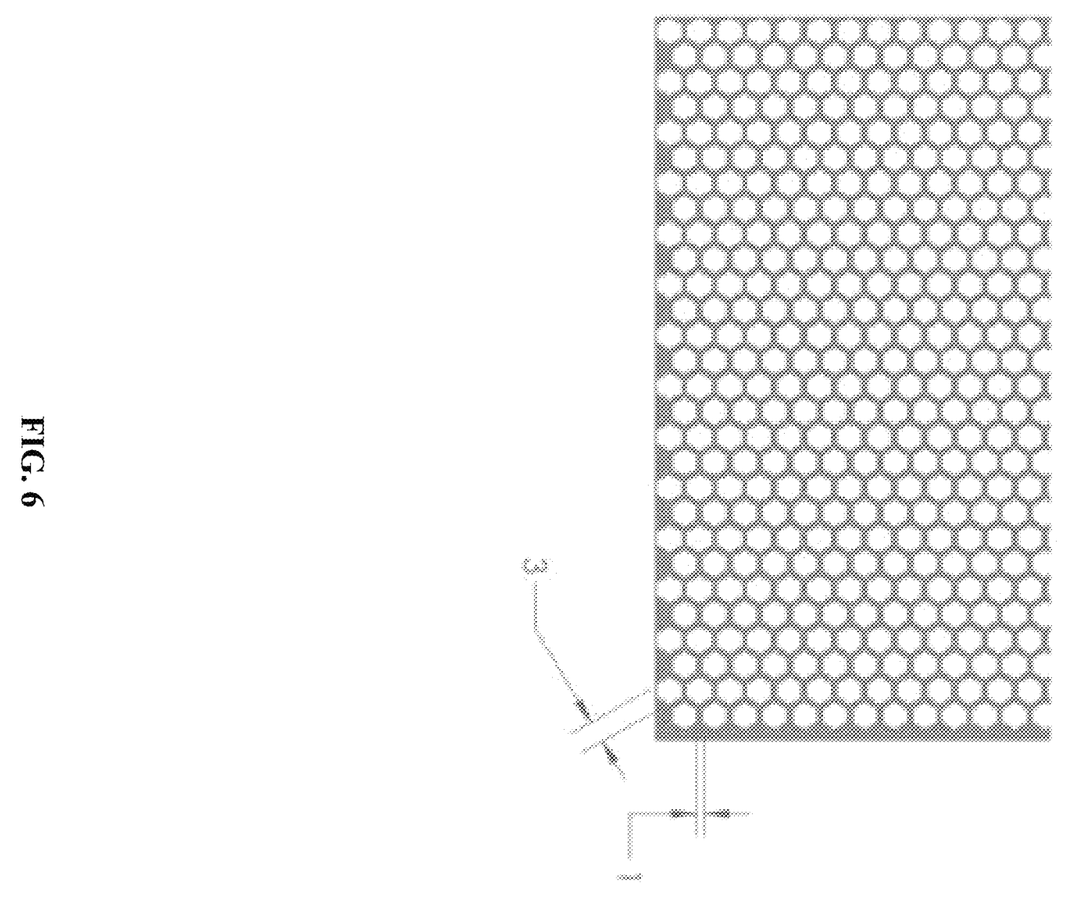
FIG. 6: Depicted in FIG. 6 is a single layer of the 3D embossed film made with a thermoplastic elastomer single layer at >0.003".
Figure 7:
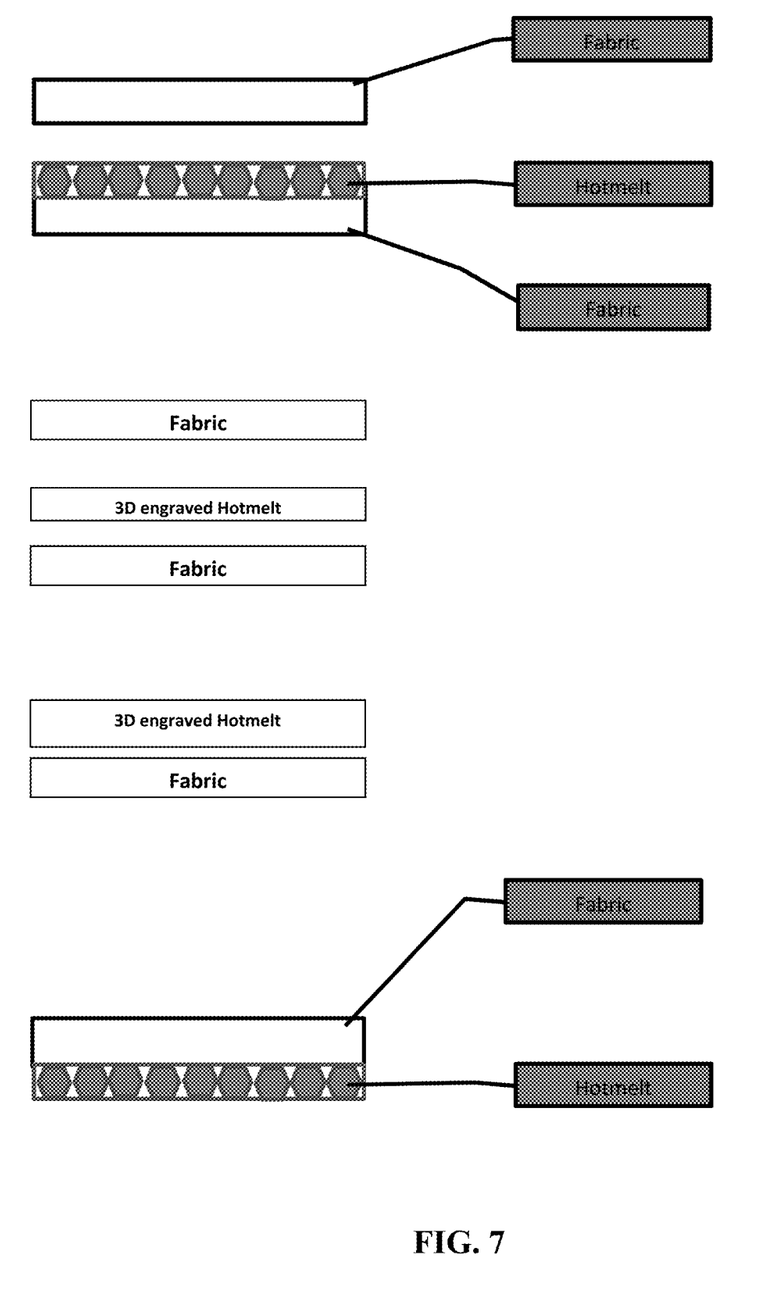
FIG. 7: Depicted in FIG. 7 is a multilayer laminate cross-sectional view of a multilayer structure including a surface layer of fabric, a middle layer comprising the 3D embossed adhesive film and a base fabric.

The embossed film of the instant invention can be made using an extrusion film process using an embossed pattern with an engraved roll with different geometries/designs as depicted in FIG. 5. The invention can include a mono or multilayer solution made of a thermoplastic elastomer adhesive, elastic or rigid, such as styrene block copolymers, polyurethane block-copolymers, ionomeric thermoplastic elastomers, polyamide thermoplastic elastomers, polyether polyester thermoplastic elastomers and vulcanized thermoplastic elastomers.

The instantly claimed film can be made as a single layer or a multi-layer laminate, as discussed below:

A. Single Layer of 3D Embossed Film

The film would be bonded, connected, or attached onto a fabric using a sewing method or through a heat lamination process. The single layer is made of a thermoplastic elastomer such as styrene-block-copolymer, polyurethane block-copolymers, ionomeric thermoplastic elastomers, polyamide thermoplastic elastomers, polyether polyester thermoplastic elastomers and vulcanized thermoplastic elastomers.

B. Multilayer Laminate.

The multilayer laminate can include two (one fabric, one adhesive) or more layers of fabric/adhesive and can be made using an extrusion process of the adhesive film with a post lamination process of bonding the adhesive film onto the fabric. The post lamination process onto the fabric would be made using a belt lamination process, ultrasonic welding, RF welding, heated flat press or a continuous bonding process. The core layer of thickness>0.003" with the 3D engraved pattern is made of a thermoplastic elastomer such as styrene-block-copolymer, polyurethane block-copolymers, ionomeric thermoplastic elastomers, polyamide thermoplastic elastomers, polyether polyester thermoplastic elastomers and vulcanized thermoplastic elastomers.

Adhesive sheets with embossed 3d structures were made using the methods discussed below:

A Styrenic Block Copolymer, and blends thereof, was cast extruded at the targeted gauge from an extrusion die in the commercial cast extrusion process. The extruded polymer web was pressed into a preset nip gap between a rubber and metal chill roll. The metal chill roll emboss pattern was made via chemical etching the negative image of the desired 3D emboss geometry into the roll surface. Symmetric patterns such as circles or honeycomb that transfer onto the film or sheet surface create directional forces in the elastic sheet whereby tensile strength was greatest in the machine direction and less in the cross-machine direction. Making ovals, grid or linear asymmetric patterns with their axis in the cross-machine direction creates more uniform or balanced forces in both directions. Accordingly, the directionality of the force, stretch and recovery can be controlled at any angle from the machine direction to meet the requirements of the fabric used in apparel or other applications. Similarly, the magnitude of the force, whether very light or higher elastic forces, can be controlled by the thickness of the "web" or base of the film. To do this, the gap between the Rubber Nip Roll surface and the top of the embossed pattern on the Metal Embossing Roll must be set to a desired offset distance. This dictates the thickness of the continuous web from which the geometric embossed pattern will protrude. The embossed pattern height from the web surface was determined by the depth of the embossed pattern, however the web thickness was controlled by this gap offset. The maximum thickness of the film or sheet made was then the combination of the web thickness and embossed protrusion height.

Unique to this construction was that the web thickness and geometric embossed protrusion height are controlled separately. A thin web applies a lower tensile force while a thick web applies greater tensile force substantially independent of the "discontinuous" embossed pattern. Therefore, the total force and the direction of force can be designed into the elastic adhesive film or tape product in one layer or by using a multilayer laminate, construction. This gives complete control of compressive and recovery forces in terms of amount and direction. For example, a designer of apparel can control the force and direction of one part of a garment using 3D embossing and gauge to apply light compressive force to a person's waist while another part of the garment can produce a strong lifting support to brace another part of the wearers' anatomy. For shapewear, panties, bras, yoga pants, medical bracing and athletic wear the opportunity to create innovative apparel in one sheet becomes obvious. The ability to also perforate the web base between the geometric embossed protrusions adds additional design functionality in terms of breathability and comfort to the film and fabric laminates produced via this invention.

After the molten polymer was compressed through the roll nip gap, the molten polymer cools, solidifies and shrinks onto the embossed pattern. As a result, the solidifying polymer film or sheet is carried by the Metal Embossing Roll and transferred to the Metal Cooling roll where it continues to cool and setup. The film or sheet with the embossed pattern is carried via idler rolls to a pull roll station where the film edges are slit or the full width film is slit into narrower rolls or tape. This process step is often done in a conversion step after making a full-width "Master Roll." After the pull roll and slitting station the film or sheet is wound into a smaller diameter roll of predetermined length or into a larger master roll. Full width, multiples of full width or narrow tape rolls are slit and wound off the master roll to make rolls for downstream processing such as lamination (i.e., to both elastic and rigid fabrics on one or both sides) and then to pattern die-cutting, laser cutting or seam lamination, etc. to fabricate final apparel or textile products.

Similarly, this 3D embossed elastic adhesive product could be embossed on both sides via the addition of a negative embossed pattern being etched onto the rubber roll surface. With thicker web constructions, the top Nip Roll could also be made similar to the Metal Embossing Roll in the first instance. Having embossed protrusions on both sides of the extruded web allows controlled directional forces as mentioned above while allowing fabrics to be bonded to both sides of the film or sheet. It was the embossed protrusions which are sized to an excess height to allow the geometric pattern to control directional forces with the understanding that during heat press or belt lamination, a portion of the total embossed height will be lost as the styrenic block copolymer and blends thereof melt under heat and pressure and wet out and saturate the fabric or porous substrate at the film-to-fabric/substrate interface. The melt both mechanically entangles with the openings in the fabric weave or porous substrate as well as adheres in some cases with the fabric or substrate to create a meaningful mechanical laminate structure. Other elastomers can be selected for their elastic resilience properties and adhesion affinity for potential fabric or substrate choices. In this way, blends of elastomers have been formulated and tuned to meet the requirements of stretch/compression force and bonding to substrates in downstream lamination processes according to their end-use.

Additionally, the thermoplastic elastomer web can be tandem extruded or coextruded as two, three, or multilayered elastomer laminates and embossed while in the melt state as in the cast extrusion process described above. This allows further tailoring of the adhesive properties, melting points, and elastic moduli of the inner and outer layers for specific difficult to bond or low-temp lamination requirements where fabrics or substrates may be susceptible to shrinking, singeing or burning in process. A low heat activated elastomeric hot-melt can be tandem or coextruded with thermally stable core elastomer to give a low-temperature bonding embossed elastic adhesive where a monolayer elastomeric adhesive would require too high a processing temperature for bonding to unstable fabrics.

The invention claimed is:

1. A multi-layer composite garment comprising:
   a porous substrate;
   a fabric layer made from natural material, synthetic material or a combination thereof;

an adhesive layer, wherein the adhesive layer is functionalized, the adhesive layer having a first surface and an opposite second surface;

wherein the first surface of the adhesive layer is embossed with first 3D adhesive structures such that at least 20% of the first 3D adhesive structures melt bonds by penetrating through the fabric layer; and wherein the second surface of the adhesive layer is embossed with second 3D adhesive structures, wherein from about 25% to about 33% of the second 3D adhesive structures melt bonds by penetrating through the porous substrate, and wherein the first 3D adhesive structures are arranged approximately 1 to 4 mm from each other and wherein the second 3D adhesive structures are arranged approximately 1 to 4 mm from each other.

2. The multi-layer composite garment of claim 1, wherein the porous substrate is a non-stretchable fabric, a stretchable fabric, or a combination thereof.

3. The multi-layer composite garment of claim 1, wherein the adhesive sheet has a stretchable function.

4. The multi-layer composite garment of claim 1, wherein the porous substrate is selected from the group consisting of fabric, dry-fit fabric, elastomeric fabric, breathable fabric, or a combination thereof.

5. The multi-layer composite garment of claim 1, wherein each of the adhesive sheet and the porous substrate has elasticity to stretch and recover/recoil from the stretch.

6. The multi-layer composite garment of claim 4, wherein the group consisting of fabric, dry-fit fabric, elastomeric fabric and breathable fabric, is manufactured of polyester, thermoplastic polyester elastomer, thermoplastic polyurethane, and polyamides, microfibers made from woven acrylic, polyester or rayon filaments, styrenic block copolymers, block copolymer of polyester-polyurethane and rayon, polypropylene, flexible PVC, and natural fibers including cotton, wool, or bamboo.

7. The multi-layer composite garment of claim 1, wherein the adhesive sheet further comprises a single layer of 3D embossed film, and wherein the single layer is functionalized and formed of a thermoplastic elastomer.

8. The multi-layer composite garment of claim 7, wherein the thermoplastic elastomer is selected from the group consisting of styrenic block copolymers, thermoplastic polyurethane, polyester-polyurethane or polyurea, polyamides and polyester.

9. The multi-layer composite garment of claim 1, wherein the adhesive layer is selected from the group consisting of styrenic block copolymers, thermoplastic polyurethane, polyester-polyurethane or polyurea, polyamides and polyester.

10. A multi-layer composite garment comprising:
a porous substrate;
a fabric layer made from natural material, synthetic material or a combination thereof;
an adhesive layer, wherein the adhesive layer is functionalized, the adhesive layer having a first surface and an opposite second surface;

wherein the first surface of the adhesive layer is embossed with first 3D adhesive structures such that at least 20% of the first 3D adhesive structures melt bonds by penetrating through the fabric layer; and wherein the second surface of the adhesive layer is embossed with second 3D adhesive structures, wherein from about 33% to about 50% of the second 3D adhesive structures melt bonds by penetrating through the porous substrate, and wherein the first 3D adhesive structures are arranged approximately 1 to 4 mm from each other and wherein the second 3D adhesive structures are arranged approximately 1 to 4 mm from each other.

11. The multi-layer composite garment of claim 10, wherein the porous substrate is a non-stretchable fabric, a stretchable fabric, or a combination thereof.

12. The multi-layer composite garment of claim 10, wherein the adhesive sheet has a stretchable function.

13. The multi-layer composite garment of claim 10, wherein the porous substrate is selected from the group consisting of fabric, dry-fit fabric, elastomeric fabric, breathable fabric, or a combination thereof.

14. The multi-layer composite garment of claim 10, wherein each of the adhesive sheet and the porous substrate has elasticity to stretch and recover/recoil from the stretch.

15. The multi-layer composite garment of claim 13, wherein the group consisting of fabric, dry-fit fabric, elastomeric fabric and breathable fabric, is manufactured of polyester, thermoplastic polyester elastomer, thermoplastic polyurethane, and polyamides, microfibers made from woven acrylic, polyester or rayon filaments, styrenic block copolymers, block copolymer of polyester-polyurethane and rayon, polypropylene, flexible PVC, and natural fibers including cotton, wool, or bamboo.

16. The multi-layer composite garment of claim 10, wherein the adhesive sheet is comprised of a single layer of 3D embossed film, and wherein the single layer is functionalized and formed of a thermoplastic elastomer.

17. The multi-layer composite garment of claim 16, wherein the thermoplastic elastomer is selected from the group consisting of styrenic block copolymers, thermoplastic polyurethane, polyester-polyurethane or polyurea, polyamides and polyester.

18. The multi-layer composite garment of claim 10, wherein the adhesive layer is selected from the group consisting of styrenic block copolymers, thermoplastic polyurethane, polyester-polyurethane or polyurea, polyamides and polyester.

* * * * *